United States Patent
Marchand et al.

(10) Patent No.: US 9,174,202 B2
(45) Date of Patent: Nov. 3, 2015

(54) CATALYST THAT CAN BE USED IN HYDROTREATMENT, COMPRISING METALS OF GROUPS VIII AND VIB, AND PREPARATION WITH ACETIC ACID AND DIALKYL SUCCINATE C1-C4

(75) Inventors: Karin Marchand, Lyons (FR); Bertrand Guichard, Izeaux (FR); Mathieu Digne, Lyons (FR); Michael Rebeilleau, Harfleur (FR); Sylvie Lopez, Lyons (FR); Antoine Hugon, Lyons (FR); Audrey Bonduelle, Francheville (FR)

(73) Assignees: TOTAL RAFFINAGE MARKETING, La Defense (FR); IFP ENERGIES NOUVELLES, Rueil-Malmaison Cedex (FR)

( * ) Notice: Subject to any disclaimer, the term of this patent is extended or adjusted under 35 U.S.C. 154(b) by 498 days.

(21) Appl. No.: 13/516,411
(22) PCT Filed: Dec. 8, 2010
(86) PCT No.: PCT/FR2010/000819
§ 371 (c)(1), (2), (4) Date: Sep. 26, 2012
(87) PCT Pub. No.: WO2011/080407
PCT Pub. Date: Jul. 7, 2011

(65) Prior Publication Data
US 2013/0008829 A1   Jan. 10, 2013

(30) Foreign Application Priority Data

Dec. 16, 2009 (FR) ..................................... 09 06101
Dec. 16, 2009 (FR) ..................................... 09 06103

(51) Int. Cl.
*B01J 31/04* (2006.01)
*B01J 27/14* (2006.01)
(Continued)

(52) U.S. Cl.
CPC *B01J 27/14* (2013.01); *B01J 23/28* (2013.01); *B01J 23/75* (2013.01); *B01J 27/19* (2013.01);
(Continued)

(58) Field of Classification Search
CPC .... B01J 31/0209; B01J 31/0201; B01J 31/04; B01J 37/043; B01J 37/0515; B01J 37/05152
USPC .................................................. 502/150, 170
See application file for complete search history.

(56) References Cited

U.S. PATENT DOCUMENTS 5,198,100 A * 3/1993 Aldridge et al. ................ 208/89
7,956,000 B2   6/2011 Jansen et al.
(Continued)

FOREIGN PATENT DOCUMENTS

EP   1 892 039 A1   2/2008
WO   2005/035691 A1   4/2005
(Continued)

OTHER PUBLICATIONS

Dumeignil et al. ("Characterization and hydrodesulfurization activity of CoMo catalysts supported on boron-doped sol-gel alumina," Applied Catalysis A 315, pp. 18-28, Nov. 2006).*
(Continued)

*Primary Examiner* — Melvin C Mayes
*Assistant Examiner* — James Corno
(74) *Attorney, Agent, or Firm* — Miller, White, Zelano & Branigan, P.C.

(57) ABSTRACT

A catalyst usable in hydrotreatment processes: an alumina-based amorphous support, phosphorus, a C1-C4 dialkyl succinate, acetic acid and a hydro-dehydrogenizing function of at least one group VIII element and at least one group VIB element, preferably made up of cobalt and molybdenum, a catalyst whose Raman spectrum comprises the most intense bands characteristic of the Keggin heteropolyanions (974 and/or 990 $cm^{-1}$), C1-C4 dialkyl succinate and acetic acid (896 $cm^{-1}$). Preferably, the dialkyl succinate concerned is dimethyl succinate and its main band is at 853 $cm^{-1}$.

23 Claims, 2 Drawing Sheets

(51) Int. Cl.
| | |
|---|---|
| *B01J 23/28* | (2006.01) |
| *B01J 23/75* | (2006.01) |
| *B01J 27/19* | (2006.01) |
| *B01J 37/02* | (2006.01) |
| *C10G 45/04* | (2006.01) |
| *C10G 45/08* | (2006.01) |
| *C10G 45/46* | (2006.01) |
| *C10G 45/48* | (2006.01) |
| *C10G 47/12* | (2006.01) |
| *C10G 49/04* | (2006.01) |

(52) U.S. Cl.
CPC ............ *B01J 37/0201* (2013.01); *C10G 45/04* (2013.01); *C10G 45/08* (2013.01); *C10G 45/46* (2013.01); *C10G 45/48* (2013.01); *C10G 47/12* (2013.01); *C10G 49/04* (2013.01); *C10G 2300/1055* (2013.01); *C10G 2300/202* (2013.01); *C10G 2300/70* (2013.01); *C10G 2400/04* (2013.01)

(56) References Cited

U.S. PATENT DOCUMENTS

| | | | |
|---|---|---|---|
| 7,981,828 B2 | 7/2011 | Devers et al. | |
| 2007/0275845 A1* | 11/2007 | Jansen et al. | 502/24 |
| 2008/0053872 A1 | 3/2008 | Devers et al. | |
| 2008/0194892 A1* | 8/2008 | Cholley et al. | 585/277 |
| 2010/0044274 A1 | 2/2010 | Brun et al. | |
| 2010/0243530 A1* | 9/2010 | Marchand et al. | 208/141 |
| 2011/0094939 A1 | 4/2011 | Jansen et al. | |

FOREIGN PATENT DOCUMENTS

| | | |
|---|---|---|
| WO | 2006/077326 A1 | 7/2006 |
| WO | 2008/090282 A2 | 7/2008 |
| WO | WO 2009007522 A3 * | 3/2009 |

OTHER PUBLICATIONS

International Search Report, dated May 31, 2011, issued in corresponding PCT/FR2010/000819.

* cited by examiner

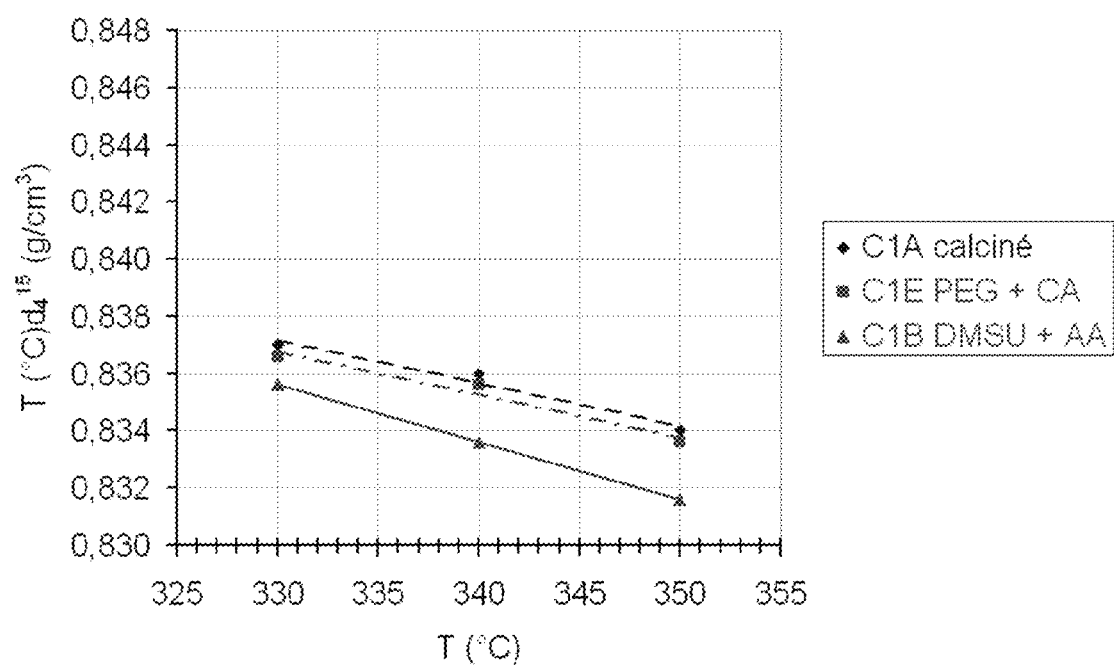
Figure 1 (ex 2)

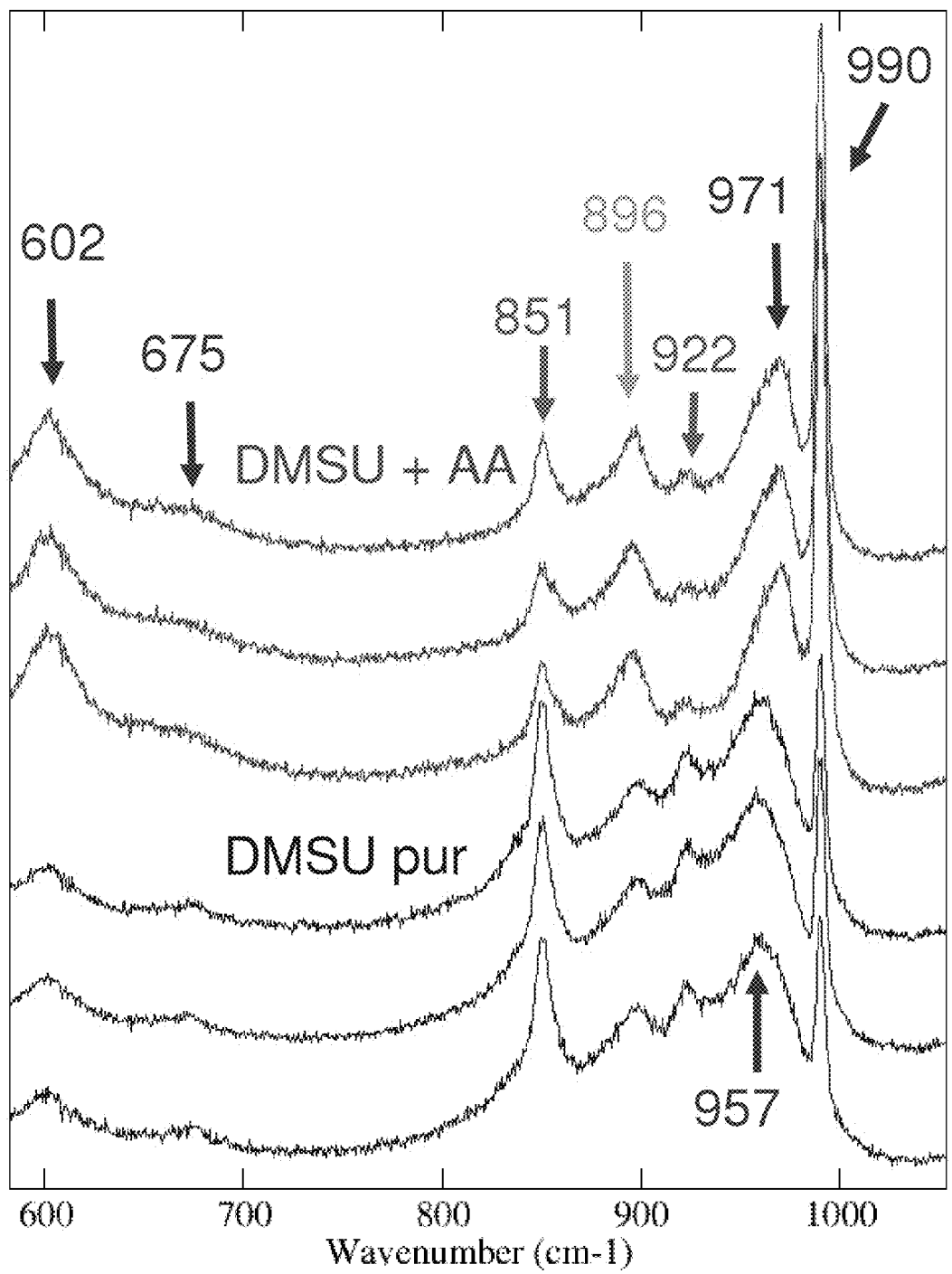
Figure 2 (ex 7)

CATALYST THAT CAN BE USED IN HYDROTREATMENT, COMPRISING METALS OF GROUPS VIII AND VIB, AND PREPARATION WITH ACETIC ACID AND DIALKYL SUCCINATE C1-C4

FIELD OF THE INVENTION

The invention relates to a catalyst, its method of preparation and its use in the sphere of hydrotreatments.

Usually, the purpose of a hydrocarbon cut hydrotreatment catalyst is to eliminate the sulfur or nitrogen compounds contained in such cuts so that a petroleum product meets the required specifications for example (sulfur content, aromatics content, etc.) for a given application (car fuel, gasoline or diesel fuel, heating oil, jet fuel). The goal can also be to pre-treat this feed so as to eliminate the impurities it contains prior to subjecting it to various conversion processes in order to modify the physico-chemical properties thereof, such as, for example, reforming, vacuum distillate hydrocracking, catalytic cracking, atmospheric or vacuum residue hydroconversion processes. The composition and the use of hydrotreatment catalysts are particularly well described in the article by B. S. Clausen, H. T. Topsøe and F. E. Massoth, from the book Catalysis Science and Technology, Vol. 11 (1996), Springer-Verlag. After sulfurization, several surface species are present on the support, which do not all show good performances for the desired reactions. These species are particularly well described in the publication by Topsøe et al. published in issue No. 26 of Catalysis Review Science and Engineering of 1984, pp. 395-420.

The tightening of vehicle pollution standards in the European Community (Official Journal of the European Union, L76, 22 Mar. 2003, Directive 2003/70/CE, pp. L76/10-L76/19) has compelled refiners to considerably reduce the sulfur content in diesel fuels and gasolines (maximum 10 ppm weight of sulfur on 1 Jan. 2009, vs. 50 ppm on 1 Jan. 2005). Besides, refiners are compelled to use feeds that are increasingly refractory to hydrotreatment processes, on the one hand because crudes are increasingly heavy and therefore contain more and more impurities and, on the other hand, because of the increase of conversion processes in refineries. In fact, the latter generate cuts that are more difficult to hydrotreat than cuts directly resulting from atmospheric distillation. An example thereof is the diesel cut obtained from catalytic cracking, also referred to as LCO (Light Cycle Oil) in reference to its high aromatic compounds content. These cuts are co-treated with the diesel cut obtained from atmospheric distillation; they require catalysts having highly improved hydrodesulfurizing and hydrogenizing functions in relation to conventional catalysts so as to decrease the aromatics content in order to obtain a density and a cetane number in accordance with specifications.

Besides, conversion processes such as catalytic cracking or hydrocracking use catalysts having an acid function, which makes them particularly sensitive to the presence of nitrogen impurities, and particularly basic nitrogen compounds. It is therefore necessary to use catalysts for pre-treating these feeds so as to remove these compounds. These hydrotreatment catalysts also require an improved hydrogenizing function insofar as the first hydrodenitrogenation stage is known as a stage of hydrogenation of the aromatic ring adjacent to the C—N bond.

It is therefore interesting to find means of preparing hydrotreatment catalysts allowing to obtain new catalysts with improved performances.

BACKGROUND OF THE INVENTION

Adding an organic compound to hydrotreatment catalysts in order to improve their activity is now well known to the person skilled in the art. Many patents protect the use of various ranges of organic compounds such as mono-, di- or polyalcohols, possibly etherized (WO96/41848, WO01/76741, U.S. Pat. Nos. 4,012,340, 3,954,673, EP601722). Catalysts modified with C2-C14 monoesters are described in patent applications EP466568 and EP1046424, however these modifications do not always allow to sufficiently increase the performances of the catalyst in order to meet the specifications relative to the sulfur contents of fuels, which have become increasingly restricting for refiners.

In order to overcome this, patent WO2006/077326 filed by the TOTAL Company proposes using a catalyst comprising groups VIB and VIII metals, a refractory oxide as the support and an organic compound, comprising at least 2 carboxylic ester functions of formula R1-O—CO—R2-CO—O—R1 or R1-CO—O—R2-O—CO—R1 wherein each R1 independently represents a C1 to C18 alkyl group, a C2 to C18 alkenyl group, a C6 to C18 aryl group, a C3 to C8 cycloalkyl group, a C7 to C20 alkylaryl or arylalkyl group, or the 2 groups R1 jointly form a C2 to C18 divalent group, and R2 represents a C1 to C18 alkylene group, a C6 to C18 arylene group, a C3 to C7 cycloalkylene group, or a combination thereof, and the carbon chain of the hydrocarbon groups represented by R1 and R2 can contain or carry one or more heteroatoms selected from among N, S and O, and each group R1 and R2 can carry one or more substituents of formula —C(=O)O—R1 or —O—C(=O)—R1, where R1 has the aforementioned meaning. A preferred mode uses C1-C4 dialkyl succinate, and in particular dimethyl succinate that is exemplified. These compounds can be introduced in the presence of a solvent (a considerable list of solvents is mentioned) or of a carboxylic acid. Among the about thirty acids notably mentioned, there is acetic acid, which is however not mentioned among the ten preferred acids. It can be noted already that citric acid is preferred.

The catalyst preparation method as described in patent WO2006/077326 comprises maturation and thermal treatment stages that can last up to several days, for example from 49 days to 115 days, which would greatly limit the production of these catalysts and would therefore require improvements.

Other patents of the prior art describe an activity gain linked with the combined use of an organic acid or an alcohol on a hydrotreatment catalyst. Thus, patent application No.JP1995-136523 filed by KK Japan Energy provides a solution consisting in:

preparing according to a first preferred mode of the invention a solution containing a catalyst support, one or more metals from group VI of the periodic table and from group VIII, an organic acid. According to a second preferred mode of the invention, this solution also comprises a phosphorus precursor, carrying out a thermal treatment between 200° C. and 400° C., carrying out impregnation of the catalyst obtained above by an organic acid or an alcohol with a ratio of 0.1 to 2 per mole of metals.

One of the preferred modes of the invention then comprises drying at a temperature below 200° C., whereas a second preferred mode of the invention comprises a final thermal treatment at a temperature greater than or equal to 400° C.

It has been observed that these catalysts do not have a sufficient activity to meet the new environmental standards in the face of the increasingly hydrogen-poor feeds available to refiners.

Similarly, patent WO2005/035691 claims an activation method that schematically allows to decrease the proportion of crystallized phase of $CoMoO_4$ type present on the regenerated catalysts comprising groups VIII and VIB metal oxides, a method comprising contacting the regenerated catalyst with an acid and an organic additive. Therefore, the citric acid (CA)-polyethylene glycol (PEG) combination has been used on a regenerated catalyst in many examples.

SUMMARY OF THE INVENTION

The present invention relates to a catalyst and to its preparation method, the catalyst being usable for hydrotreatment and allowing to improve the catalytic performances (notably the catalytic activity) in relation to the catalysts of the prior art. In fact, it has been shown that using the pair made up of C1-C4 dialkyl succinate, in particular dimethyl, and of acetic acid on a dried catalytic precursor surprisingly leads to a markedly improved catalytic activity in comparison with each one of the compounds of the pair.

More precisely, the invention relates to a catalyst comprising an alumina-based amorphous support, phosphorus, at least one C1-C4 dialkyl succinate, acetic acid and a hydro-dehydrogenizing function comprising at least one group VIII element and at least one group VIB element, a catalyst whose Raman spectrum comprises the bands at 990 and/or 974 $cm^{-1}$ characteristic of at least one Keggin heteropolyanion, the bands characteristic of said succinate and the main band at 896 $cm^{-1}$ characteristic of acetic acid. The hydro-dehydrogenizing function preferably consists of cobalt and molybdenum. It can also comprise at least one group VIII element and at least one group VIB element, except for the hydro-dehydrogenizing function consisting of cobalt and molybdenum.

The catalyst obtained has a characteristic Raman spectrum grouping together:
1) Bands characteristic of the heteropolyanion(s) of Keggin $PXY_{11}O_{40}^{x-}$ and/or $PY_{12}O_{40}^{x-}$ type where Y is a group VIB metal and X is a group VIII metal.

According to Griboval, Blanchard, Payen, Fournier, Dubois in Catalysis Today 45 (1998) 277 FIG. 3e), the main bands of the $PCoMo_{11}O_{40}^{x-}$ structure are on a dried catalyst at 232, 366, 943, 974 $cm^{-1}$ and, according to M. T. Pope "Heteropoly and Isopoly oxometalates", Springer Verlag, p 8, these bands are not characteristic of the nature of atom X or Y, but of the structure of the HPA. The most intense band characteristic of this type of lacunar Keggin HPA is at 974 $cm^{-1}$.

According to Griboval, Blanchard, Gengembre, Payen, Fournier, Dubois, Bernard, Journal of Catalysis 188 (1999) 102, FIG. 1a), the main bands of $PMo_{12}O_{40}^{x-}$ are in the mass state of the HPA, for example with cobalt as the counterion at 251, 603, 902, 970, 990 $cm^{-1}$. The most intense band characteristic of this Keggin HPA is at 990 $cm^{-1}$. M. T. Pope "Heteropoly and Isopoly oxometalates", Springer Verlag, p 8, also teaches us that these bands are not characteristic of the nature of atom X or Y, but of the structure of the Keggin HPA, complete, lacunar or substituted.

2) Bands characteristic of the dialkyl succinate(s) used. The Raman spectrum of the dimethyl succinate is a univocal fingerprint of this molecule. In the 300-1800 $cm^{-1}$ spectral zone, this spectrum is characterized by the series of bands as follows (only the most intense bands are recorded, in $cm^{-1}$): 391, 853 (most intense band), 924, 964, 1739 $cm^{-1}$. The spectrum of the diethyl succinate comprises, in the spectral zone considered, the main bands as follows: 861 (most intense band), 1101, 1117 $cm^{-1}$. Similarly, for the dibutyl succinate: 843, 1123, 1303, 1439, 1463 $cm^{-1}$ and the diisopropyl succinate: 833, 876, 1149, 1185, 1469 (most intense band), 1733 $cm^{-1}$.

3) Bands characteristic of acetic acid, with the main ones: 448, 623, 896 $cm^{-1}$. The most intense band is 896 $cm^{-1}$.

The exact position of the bands, their shapes and their relative intensities can vary to a certain extent depending on the spectrum recording conditions, while remaining characteristic of this molecule. The Raman spectra of the organic compounds are besides well documented, either in the Raman spectrum databases (see for example Spectral Database for Organic Compounds, http://riodb01.ibase.aist.go.jp/sdbs/cgi-bin/direct_frame_top.cgi), or by the suppliers of the product (see for example www.sigmaaldrich.com).

The Raman spectra are obtained with a dispersive Raman type spectrometer equipped with an ionized argon laser (514 nm). The laser beam is focussed on the sample by means of a microscope equipped with a ×50 long working distance objective. The power of the laser at the level of the sample is of the order of 1 mW. The Raman signal emitted by the sample is collected by the same objective and dispersed by means of a 1800 rpm network, then collected by a CCD detector. The spectral resolution obtained is of the order of 0.5 $cm^{-1}$. The spectral zone recorded ranges between 300 and 1800 $cm^{-1}$. The acquisition time is set at 120 s for each Raman spectrum recorded.

Preferably, the dialkyl succinate used is dimethyl succinate, and the catalyst has in its spectrum the main Raman bands at 990 and/or 974 $cm^{-1}$ characteristic of the Keggin heteropolyanion(s), 853 $cm^{-1}$ characteristic of dimethyl succinate and 896 $cm^{-1}$ characteristic of acetic acid.

Preferably, the catalyst of the invention comprises a support consisting of alumina or silica-alumina.

The catalyst according to the invention can also comprise boron and/or fluorine and/or silicon.

A method of preparing the catalyst according to the invention is also described. It comprises at least one stage of impregnation of a catalytic precursor dried at a temperature below 180° C., containing at least phosphorus and a hydro-dehydrogenizing function, as well as an amorphous support, by an impregnation solution comprising the combination of acetic acid and C1-C4 dialkyl succinate, followed by a stage of maturation of said impregnated catalytic precursor, then a drying stage at a temperature below 180° C., without subsequent calcination stage (thermal treatment in air). The catalyst obtained is preferably subjected to a sulfurization stage.

The hydro-dehydrogenizing function comprises at least one group VIII element and at least one group VIB element. Preferably, the hydro-dehydrogenizing function consists of cobalt and molybdenum.

The simple and fast preparation method, with unit stages that do not exceed some hours, thus allows to obtain a higher productivity on the industrial scale than the methods of the prior art.

More precisely, the method of preparing a hydrotreatment catalyst according to the invention comprises the successive stages as follows, which will be detailed below:

a) at least one stage of impregnation of an alumina-based amorphous support by at least one solution containing the elements of the hydro-dehydrogenizing function and phosphorus. The product obtained is referred to as "catalytic precursor", b) drying at a temperature below 180° C. without subsequent calcination. The product obtained is referred to as "dried catalytic precursor", c) at least one stage of impregnation by an impregnation solution comprising at least one C1-C4 dialkyl succinate, acetic acid and at least one phosphorus compound, if the latter has not been entirely introduced in stage a). The product obtained is referred to as "impregnated dried catalytic precursor", d) a maturation stage, e) a drying stage at a temperature below 180° C., without subsequent calcination stage. The product obtained is referred to as "catalyst".

Preferably, the product obtained at the end of stage e) is subjected to a sulfurization stage f).

As described below, the method according to the invention is preferably carried out with the following modes, alone or in combination: the support consists of alumina or silica-alumina; all of the hydrogenizing function is introduced in stage a); all of the phosphorus is introduced in stage a); the dialkyl succinate is dimethyl succinate; stage c) is carried out in the absence of solvent; stage d) is carried out at a temperature ranging from 17° C. to 50° C.; stage e) is carried out at a temperature ranging between 80° C. and 160° C.

More preferably, the method according to the invention comprises the successive stages as follows:

a) at least one stage of dry impregnation of said support by a solution containing all of the elements of the hydro-dehydrogenizing function and all of the phosphorus, b) drying at a temperature ranging between 75° C. and 130° C. without subsequent calcination, c) at least one stage of dry impregnation by an impregnation solution comprising dimethyl succinate and acetic acid, d) a maturation stage at 17° C.-50° C., e) a drying stage, preferably under nitrogen, at a temperature ranging between 80° C. and 160° C., without subsequent calcination stage.

The catalytic precursor containing the hydro-dehydrogenizing function and an alumina-based amorphous support, as well as its preparation mode, are described below.

DETAILED DESCRIPTION

Said catalytic precursor obtained at the end of stage a) of the method according to the invention can be prepared to a great extent by means of any method known to the person skilled in the art.

Said catalytic precursor contains a hydro-dehydrogenizing function and it contains phosphorus and/or boron and/or fluorine as a dopant, as well as the amorphous support. The hydro-dehydrogenizing function comprises at least one group VIB element and at least one group VIII element. Preferably, the hydro-dehydrogenizing function consists of cobalt and molybdenum.

The amorphous support of said catalytic precursor is based on alumina, i.e. it contains more than 50% alumina and it generally contains only alumina or silica-alumina as defined below, and optionally the metal(s) and/or the dopant(s) that have been introduced outside the impregnations (introduced for example during the preparation, kneading, peptization, etc., of the support or shaping thereof). The support is obtained after shaping (extrusion for example) and calcination, in general between 300° C.-600° C.

Preferably, the support consists of alumina, and preferably of extruded alumina. The alumina is preferably gamma alumina and said amorphous support preferably consists of gamma alumina.

In another preferred case, it is a silica-alumina containing at least 50% alumina. The proportion of silica in the support is at most 50 wt. %, most often less than or equal to 45 wt. % and preferably less than or equal to 40 wt. %.

Silicon sources are well known to the person skilled in the art. Examples thereof are silicic acid, silica in powder or colloidal form (silica sol), tetraethylorthosilicate $Si(OEt)_4$.

The hydro-dehydrogenizing function of said catalytic precursor is provided by at least one group VIB element and at least one group VIII element. The pair made up of cobalt and molybdenum is preferred. The total proportion of hydro-dehydrogenizing elements is advantageously above 6 wt. % oxide in relation to the total weight of catalyst. The preferred group VIB elements are molybdenum and tungsten, generally molybdenum. The preferred group VIII elements are non-noble elements, in particular cobalt and nickel.

Advantageously, the hydrogenizing function is selected from the group made up of the following element combinations: cobalt-molybdenum, nickel-molybdenum, nickel-cobalt-molybdenum or nickel-molybdenum-tungsten.

In cases where a high hydrodesulfurization, or hydrodenitrogenation and hydrogenation activity of the aromatics is desired, the hydro-dehydrogenizing function is advantageously fulfilled by the combination of nickel and molybdenum; a combination of nickel and tungsten in the presence of molybdenum can also be advantageous. In the case of feeds of vacuum distillate or heavier type, combinations of cobalt-nickel-molybdenum type can be advantageously used.

The molybdenum precursors that can be used are also well known to the person skilled in the art. For example, among the molybdenum sources, it is possible to use oxides and hydroxides, molybdic acids and their salts, in particular ammonium salts such as ammonium molybdate, ammonium heptamolybdate, phosphomolybdic acid ($H_3PMo_{12}O_{40}$) and their salts, and possibly silicomolybdic acid ($H_4SiMo_{12}O_{40}$) and the salts. The molybdenum sources can also be any heteropolycompound of Keggin, lacunar Keggin, substituted Keggin, Dawson, Anderson, Strandberg type for example. Molybdenum trioxide and heteropolycompounds (heteropolyanions) of Strandberg, Keggin, lacunar Keggin or substituted Keggin are preferably used.

The tungsten precursors that can be used are also well known to the person skilled in the art. For example, tungsten sources that can be used are oxides and hydroxides, tungstic acids and their salts, in particular ammonium salts such as ammonium tungstate, ammonium metatungstate, phosphotungstic acid and their salts, and optionally silicotungstic acid ($H_4SiW_{12}O_{40}$) and the salts. The tungsten sources can also be any heteropolycompound of Keggin, lacunar Keggin, substituted Keggin, Dawson type for example. Ammonium oxides and salts are preferably used, such as ammonium metatungstate, or heteropolyanions of Keggin, lacunar Keggin or substituted Keggin type.

The proportion of precursor(s) of group VIB element(s) advantageously ranges between 5 and 40 wt. % group VIB oxides in relation to the total mass of catalytic precursor, preferably between 8 and 35 wt. %, and more preferably between 10 and 30 wt. %.

The precursors of group VIII element(s) that can be used are advantageously selected from among oxides, hydroxides, hydroxycarbonates, carbonates and nitrates, for example nickel hydroxycarbonate, cobalt carbonate or cobalt hydroxide are preferably used.

The proportion of precursor(s) of group VIII element(s) advantageously ranges between 1 and 10 wt. % group VIII oxides in relation to the total mass of catalytic precursor, preferably between 1.5 and 9 wt. %, and more preferably between 2 and 8 wt. %.

The hydro-dehydrogenizing function of said catalytic precursor can be introduced in the catalyst at various levels of the preparation and in different ways. Said hydro-dehydrogenizing function is always introduced, at least partly and preferably entirely, by impregnation of the shaped support. It can also be introduced partly upon shaping said amorphous support.

In cases where the hydro-dehydrogenizing function is partly introduced upon shaping said amorphous support, it can be introduced partly (for example at most 10% group VIB elements, introduced through kneading for example) only when kneading with an alumina gel selected as the matrix, the rest of the hydrogenizing element(s) being then introduced later. Preferably, when the hydro-dehydrogenizing function is introduced partly upon kneading, the proportion of group VIB element(s) introduced during this stage is less than 5% of the total amount of group VIB elements(s) introduced on the final catalyst. Preferably, at least one group VIB element (or all of them) is introduced at the same time as at least one group VIII element (or all of them), whatever the introduction mode. These methods and proportions for the introduction of the elements are notably used in cases where the hydro-dehydrogenizing function consists of CoMo.

In cases where the hydro-dehydrogenizing function is introduced at least partly and preferably entirely after shaping said amorphous support, introduction of said hydro-dehydrogenizing function on the amorphous support can be advantageously performed by means of one or more excess solution impregnations on the shaped and calcined support, or preferably by means of one or more dry impregnations, and more preferably by dry impregnation of said shaped and calcined support, using solutions containing the metal precursor salts. More preferably yet, the hydro-dehydrogenizing function is entirely introduced after shaping said amorphous support, by dry impregnation of said support using an impregnation solution containing the metal precursor salts. Introduction of said hydro-dehydrogenizing function can also be advantageously performed by means of one or more impregnations of the shaped and calcined support, by a solution of the precursor(s) of the active phase. In cases where the elements are introduced in several impregnations of the corresponding precursor salts, an intermediate catalyst drying stage is generally carried out, at a temperature ranging between 50° C. and 180° C., preferably between 60° C. and 150° C., and more preferably between 75° C. and 130° C.

Phosphorus is also introduced in the catalyst. Another catalyst dopant can also be introduced, selected from among boron, fluorine, alone or in admixture. The dopant is an added element that has no catalytic character in itself, but which increases the catalytic activity of the metal(s).

Said dopant can be advantageously introduced alone or in admixture with at least one of the elements of the hydro-dehydrogenizing function.

It can also be introduced as early as the synthesis of the support.

It can also be introduced just before or just after peptization of the matrix selected, such as, for example and preferably, the alumina precursor aluminium oxyhydroxide (boehmite).

Said dopant can also be advantageously introduced in admixture with the precursor(s) of the hydro-dehydrogenizing function, entirely or partly on the shaped amorphous support, preferably alumina or silica-alumina in extruded form, by dry impregnation of said amorphous support using a solution containing the metals precursor salts and the dopant(s) precursor(s).

The boron source can be boric acid, preferably orthoboric acid $H_3BO_3$, ammonium biborate or pentaborate, boron oxide, boric esters. The boron can be introduced for example by a solution of boric acid in a water/alcohol mixture or in a water/ethanolamine mixture.

The preferred phosphorus source is orthophosphoric acid $H_3PO_4$, but its salts and esters such as ammonium phosphates are also suitable. The phosphorus can also be introduced at the same time as the group VIB element(s) in form of heteropolyanions of Keggin, lacunar Keggin, substituted Keggin or Strandberg type.

The fluorine sources that can be used are well known to the person skilled in the art. For example, the fluoride anions can be introduced in form of hydrofluoric acid or of its salts. These salts are formed with alkaline metals, ammonium or an organic compound. In the latter case, the salt is advantageously formed in the reaction mixture by reaction between the organic compound and the hydrofluoric acid. The fluorine can be introduced for example by impregnation of an aqueous solution of hydrofluoric acid, of ammonium fluoride or of ammonium bifluoride.

The dopant is advantageously introduced in the catalytic precursor in a proportion of oxide of said dopant in relation to the catalyst:
- ranging between 0 and 40%, preferably between 0 and 30%, more preferably between 0 and 20%, more preferably yet between 0 and 15% and most preferably between 0 and 10% when said dopant is boron; when boron is present, the minimum amount is preferably 0.1 wt. %,
- ranging between 0.1 and 20%, preferably between 0.1 and 15%, and more preferably yet between 0.1 and 10% when said dopant is phosphorus,
- ranging between 0 and 20%, preferably between 0 and 15% and more preferably yet between 0 and 10% when said dopant is fluorine; when fluorine is present, the minimum amount is preferably 0.1 wt. %.

Phosphorus is always present. It is introduced at least partly (preferably entirely) by impregnation on the catalytic precursor in stage a) and optionally on the dried catalytic precursor in stage c). The same preferably applies to the other dopants. However, as mentioned above, the dopants can be introduced partly when preparing the support (including shaping) or entirely (except for phosphorus).

The introduction of said hydro-dehydrogenizing function and optionally of a dopant in or on the shaped calcined support is then advantageously followed by a drying stage b) wherein the solvent of the metallic salts used as precursors of the metal(s) oxide(s) (a solvent that is generally water) is eliminated, at a temperature ranging between 50° C. and 180° C., preferably between 60° C. and 150° C., or between 65° C. and 145° C., more preferably between 70° C. and 140° C. or between 75° C. and 130° C. The stage of drying the "dried catalytic precursor" thus obtained is never followed by a stage of calcination in air at a temperature above 200° C. Advantageously, it is carried out in these temperature ranges, at a temperature of at most 150° C., and without subsequent calcination at a temperature above 180° C.

Preferably, in stage a) of the method according to the invention, said "catalytic precursor" is obtained by dry impregnation of a solution comprising a precursor or precursors of the hydro-dehydrogenizing function, and phosphorus on a shaped calcined alumina-based amorphous support, followed by drying at a temperature below 180° C., preferably ranging between 50° C. and 180° C., more preferably between 60° C. and 150° C., and most preferably between 75° C. and 130° C.

A "dried catalytic precursor" is thus obtained at the end of stage b).

It is possible in stage a) of the method according to the invention to prepare an impregnation solution containing at least one dopant selected from among boron, fluorine, alone or in admixture.

More preferably, the "catalytic precursor" in stage a) of the method according to the invention is prepared with an impregnation solution containing at least one precursor of each element of the hydro-dehydrogenizing function, in the presence of a phosphorus precursor, the amorphous support consisting of alumina or silica-alumina.

According to stage c) of the method of the invention, said dried catalytic precursor is impregnated by an impregnation solution comprising at least a C1-C4 dialkyl succinate (in particular dimethyl succinate) and acetic acid.

Said compounds are advantageously introduced in the impregnation solution of stage c) of the method according to the invention in a proportion corresponding to:
- a molar ratio of dialkyl (for example dimethyl) succinate per group VIB element(s) impregnated with the catalytic precursor ranging between 0.15 and 2 mole/mole, preferably between 0.3 and 1.8 mole/mole, more preferably between 0.5 and 1.5 mole/mole, and most preferably between 0.8 and 1.2 mole/mole, and
- a molar ratio of acetic acid per group VIB element(s) impregnated with the catalytic precursor ranging between 0.1 and 5 mole/mole, preferably between 0.5 and 4 mole/mole, more preferably between 1.3 and 3 mole/mole, and most preferably between 1.5 and 2.5 mole/mole. It is notably the case when the hydro-dehydrogenizing function consists of CoMo.

According to stage c) of the method of the invention, the combination of dialkyl succinate and acetic acid is introduced on the dried catalytic precursor by means of at least one impregnation stage and preferably a single stage of impregnation of an impregnation solution on said dried catalytic precursor.

Said combination can be advantageously deposited in one or more stages either by slurry impregnation or by excess impregnation, by dry impregnation or by any other means known to the person skilled in the art.

According to a preferred embodiment of stage c) of the preparation method of the invention, stage c) is a single dry impregnation stage.

According to stage c) of the method of the invention, the impregnation solution of stage c) comprises at least the combination of C1-C4 dialkyl (in particular dimethyl) succinate and of acetic acid.

The impregnation solution used in stage c) of the method of the invention can be complemented by any non-protic solvent known to the person skilled in the art comprising notably toluene, xylene.

The impregnation solution used in stage c) of the method according to the invention can be complemented by any polar solvent known to the person skilled in the art. Said polar solvent used is advantageously selected from the group made up of methanol, ethanol, water, phenol, cyclohexanol, alone or in admixture. Said polar solvent used in stage c) of the method according to the invention can also be advantageously selected from the group made up of propylene carbonate, DMSO (dimethyl sulfoxide) or sulfolane, alone or in admixture. Preferably, a polar protic solvent is used. A list of the usual polar solvents and their dielectric constant can be found in the book <<Solvents and Solvent Effects in Organic Chemistry>>, C. Reichardt, Wiley-VCH, 3rd edition, 2003, pages 472-474. Preferably, the solvent used is ethanol.

Preferably, there is no solvent in the impregnation solution used in stage c) of the method according to the invention, which facilitates its implementation on the industrial scale. It preferably only contains dialkyl succinate and acetic acid.

The dialkyl succinate used is preferably contained in the group consisting of dimethyl succinate, diethyl succinate, dipropyl succinate, diisopropyl succinate and dibutyl succinate. Preferably, the C1-C4 dialkyl succinate used is dimethyl succinate or diethyl succinate. More preferably, the C1-C4 dialkyl succinate used is dimethyl succinate. At least one C1-C4 dialkyl succinate is used, preferably only one, and preferably dimethyl succinate.

According to stage d) of the preparation method of the invention, the impregnated catalytic precursor from stage c) is subjected to a maturation stage. It is advantageously carried out at atmospheric pressure and at a temperature ranging between 17° C. and 50° C., and generally a maturation time ranging between ten minutes and forty-eight hours, preferably between thirty minutes and five hours is sufficient. Longer times are not excluded. A simple way of adjusting the maturation time is to characterize the formation of the Keggin heteropolyanions by Raman spectroscopy in the impregnated dried catalytic precursor from stage c) of the method according to the invention. Preferably, in order to increase the productivity without modifying the amount of reformed heteropolyanions, the maturation time ranges between thirty minutes and four hours. More preferably, the maturation time ranges between thirty minutes and three hours.

According to stage e) of the preparation method of the invention, the catalytic precursor from stage d) is subjected to a drying stage at a temperature below 180° C., without subsequent calcination stage at a temperature above 200° C.

The goal of this stage is to obtain a transportable, storable and manipulable catalyst, in particular for loading the hydrotreatment unit. It advantageously consists, according to the embodiment of the invention selected, in removing all or part of the optional solvent that has allowed introduction of the combination of C1-C4 dialkyl (in particular dimethyl) succinate and of acetic acid. In any case, and in particular in cases where the combination of C1-C4 dialkyl (in particular dimethyl) succinate and of acetic acid is used alone, the catalyst is to be given a dry aspect in order to prevent the extrudates from sticking to one another during the transportation, storage, handling or loading stages.

Drying stage e) of the method according to the invention is advantageously carried out using any technique known to the person skilled in the art. It is advantageously conducted at atmospheric pressure or at reduced pressure. Preferably, this stage is carried out at atmospheric pressure.

This stage e) is advantageously conducted at a temperature ranging between 50° C. and less than 180° C., preferably between 60° C. and 170° C., and more preferably between 80° C. and 160° C. Advantageously, it is carried out in these temperature ranges at a temperature of at most 160° C. (the preferred range being 80° C.-180° C.), and without subsequent calcination at a temperature above 180° C.

It is advantageously carried out in a traversed bed using air or any other hot gas. Preferably, when drying is carried out in a fixed bed, the gas used is either air or an inert gas such as argon or nitrogen. More preferably, drying is performed in a traversed bed in the presence of nitrogen.

This stage preferably lasts between 30 minutes and 4 hours, more preferably between 1 hour and 3 hours.

At the end of stage e) of the method according to the invention, a dried catalyst that is subjected to no subsequent calcination stage in air, for example at a temperature above 200° C., is obtained.

The catalyst obtained at the end of stage d) or stage e) has a Raman spectrum comprising the most intense bands at 990, 974 cm$^{-1}$ (heteropolyanions of Keggin type), the bands corresponding to the succinate (for dimethyl succinate, the most intense band is at 853 cm$^{-1}$), and the bands characteristic of the acetic acid, the most intense being at 896 cm$^{-1}$.

Prior to being used, a dried or calcined catalyst is advantageously converted to a sulfurized catalyst so as to form its active species. This activation or sulfurization stage is carried out using methods known to the person skilled in the art, and advantageously in a sulfo-reducing atmosphere in the presence of hydrogen and of hydrogen sulfide.

At the end of stage e) of the method according to the invention, said dried catalyst obtained is thus advantageously subjected to a sulfurization stage f) with no intermediate calcination stage.

Said dried catalyst is advantageously sulfurized ex situ or in situ. The sulfurizing agents are H$_2$S gas or any other compound containing sulfur used for activation of the hydrocarbon feeds in order to sulfurize the catalyst. Said sulfur-containing compounds are advantageously selected from among alkyldisulfides such as, for example, dimethyl disulfide (DMDS), alkylsulfides, such as for example dimethyl sulfide, n-butylmercaptan, polysulfide compounds of tertionylpolysulfide type such as, for example, TPS-37 or TPS-54 marketed by the ARKEMA Company, or any other compound known to the person skilled in the art allowing to obtain good sulfurization of the catalyst. Preferably, the catalyst is sulfurized in situ in the presence of a sulfurizing agent and of a hydrocarbon feed. More preferably, the catalyst is sulfurized in situ in the presence of a hydrocarbon feed to which dimethyl disulfide has been added.

Finally, another object of the invention is the use of the catalyst according to the invention in hydrotreatment processes, notably in processes such as hydro-desulfurization, hydrodenitrogenation, hydrodemetallation, hydrogenation of aromatics and hydroconversion of petroleum cuts.

The dried catalysts obtained by the method according to the invention and having preferably been previously subjected to a sulfurization stage f) are advantageously used for hydrotreatment reactions of hydrocarbon feeds such as petroleum cuts, cuts from coal or hydrocarbons produced from natural gas, and more particularly for the reactions of hydrogenation, hydrodenitrogenation, hydrodearomatization, hydro-desulfurization, hydrodemetallation or hydroconversion of hydrocarbon feeds.

In such uses, the catalysts obtained by the method according to the invention and having preferably been previously subjected to a sulfurization stage f) exhibit an improved activity in relation to the catalysts of the prior art. These catalysts can also be advantageously used during pre-treatment of the catalytic cracking feeds or hydrodesulfurization of residues, or deep hydrodesulfurization of diesel fuels (ULSD Ultra Low Sulfur Diesel).

The feeds used in hydrotreatment processes are, for example, gasolines, gas oils, vacuum gas oils, atmospheric residues, vacuum residues, atmospheric distillates, vacuum distillates, heavy fuel oil, oils, waxes and paraffins, spent oil, deasphalted residues or crudes, feeds from thermal or catalytic conversion processes, alone or in admixture. The feeds that are treated, in particular those mentioned above, generally contain heteroatoms such as sulfur, oxygen and nitrogen, and for the heavy feeds, they most often also contain metals.

The operating conditions applied in the processes implementing the hydrocarbon feed hydrotreatment reactions described above are generally as follows: the temperature advantageously ranges between 180° C. and 450° C., preferably between 250° C. and 440° C., the pressure advantageously ranges between 0.5 and 30 MPa, preferably between 1 and 18 MPa, the hourly space velocity advantageously ranges between 0.1 and 20 h$^{-1}$, preferably between 0.2 and 5 h$^{-1}$, and the hydrogen/feed ratio expressed in volume of hydrogen, measured under normal temperature and pressure conditions, per volume of liquid feed advantageously ranges between 50 l/l and 2000 l/l.

The examples hereafter show the considerable activity gain for the catalysts prepared according to the method of the invention in relation to catalysts of the prior art and they clarify the invention without however limiting the scope thereof.

BRIEF DESCRIPTION OF THE DRAWINGS

FIG. 1 is a graphical representation of effluent density measured in Example 1.

FIG. 2 is a representation of Raman spectrum obtained for various catalysts in Example 7.

EXAMPLE 1

Preparation of Calcined Catalyst C1A (NiMoP/Alumina), Dried Catalyst C1E (NiMoP/Alumina) with Citric Acid (CA) and Polyethylene Glycol (PEG) Added, (C1A and C1E are not in Accordance with the Invention), and of Dried Catalysts C1B and C1F (NiMoP/Alumina) with Acetic Acid and Dimethyl Succinate Added (in Accordance with the Invention)

A matrix consisting of ultrafine tabular boehmite or alumina gel, marketed by Condea Chemie GmbH, is used. This gel is mixed with an aqueous solution containing 66% nitric acid (7 wt. % acid per gram of dry gel), then kneaded for 15 minutes. After kneading, the dough obtained is passed through a die with 1.6-mm diameter cylindrical orifices. The extrudates are then dried over night at 120° C., and then calcined at 600° C. for 2 hours under humid air containing 50 kg water per kg of dry air. Support extrudates having a specific surface area of 300 m$^2$/g are thus obtained. X-ray diffraction analysis shows that the support only consists of cubic gamma alumina of low crystallinity.

Nickel, molybdenum and phosphorus are added on the alumina support described above, which comes in "extrudate" form. The impregnation solution is prepared by hot dissolution of the molybdenum oxide and nickel hydroxycarbonate in the phosphoric acid solution in aqueous solution in order to obtain a formulation of approximately 4/22.5/4 expressed in wt. % of nickel, molybdenum oxides and in wt. % of phosphoric anhydride in relation to the amount of dry matter of the final catalyst. After dry impregnation, the extrudates are left to mature in a water-saturated atmosphere for 12 h, then they are dried over night at 90° C. The dried catalytic precursor thus obtained is denoted by C1. The calcination of C1 at 450° C. for 2 hours leads to calcined catalyst C1A. The final composition of catalysts C1 and C1A expressed in form of oxides is then as follows: MoO$_3$=22.4±0.2 (wt. %), NiO=4.1±0.1 (wt. %) and P$_2$O$_5$=4.0±0.1 (wt. %).

Catalyst C1E is prepared by impregnation of dried catalytic precursor C1 by a solution containing citric acid (CA) and polyethylene glycol (PEG) in solution in ethanol so as to have a volume of impregnation solution equal to the porous volume of dried catalytic precursor C1. The desired proportions of citric acid (CA) and of polyethylene glycol (PEG) are both 10 wt. %.

Catalyst C1B, in accordance with the invention, is prepared from dried catalytic precursor C1 by dry impregnation of a solution containing the mixture of dimethyl succinate and of acetic acid in ethanol so as to also obtain 10 wt. % acetic acid and 10 wt. % dimethyl succinate on the final catalyst.

Catalyst C1F, in accordance with the invention, is prepared in the same way but in the absence of ethanol. A final proportion of 13 wt. % acetic acid and of 20 wt. % dimethyl succinate is sought.

The catalysts then undergo a 3-hour maturation stage at 20° C. in air, followed by a thermal treatment in a traversed bed type oven at 110° C. for 3 hours.

EXAMPLE 2

Evaluation of Catalysts C1A (NiMoP/Alumina) (not in Accordance), C1E (not in Accordance), C1B (in Accordance) for Distillation Diesel Fuel Hydrotreatment Sulfurization of the catalyst (30 cm³ catalyst in extrudate form mixed with 10 cm³ SiC of grain size 0.8 mm) is carried out at 50 bars, at an hourly space velocity of 2 h⁻¹, with an inlet $H_2$/HC ratio (volume flow rate) of 400 Std l/l. The sulfurization feed (diesel fuel with 2% DMDS Evolution from the Arkéma Company added) is fed into the reactor under $H_2$ when the latter reaches 150° C. After one hour at 150° C., the temperature is increased with a 25° C./hour ramp up to 220° C., then with a 12° C./hour ramp until a 350° C. plateau is reached, which is kept for 12 hours.

After sulfurization, the temperature is lowered to 330° C. and the test feed is injected. The catalytic test is carried out at a total pressure of 50 bars, on a waste hydrogen basis, with an hourly space velocity of 2 h⁻¹, with an inlet $H_2$/HC ratio of 400 Std l/l ($H_2$ flow rate=24 Std l·h⁻¹, feed flow rate=60 cm³·h⁻¹), and at 330° C., 340° C. and 350° C.

In order to be able to evaluate the HDS performances of the catalysts and to overcome the presence of $H_2S$, the receiving tank is stripped with nitrogen in a proportion of 10 L·h⁻¹.

The diesel fuel used here comes from an Arabian heavy crude. It contains 0.89 wt. % sulfur, 100 ppm weight of nitrogen, its PMT $[(T_5+2T_{50}4T_{95})/7]$ is 324° C. and its density 0.848 g/cm³.

The HDS activity is measured from the HDS conversion according to the formula as follows:

$$A_{HDS} = \sqrt{\frac{100}{100 - \% \, HDS}} - 1$$

and the HDS conversion (% HDS) is given by:

$$\% \, HDS = \frac{S_{feed} - S_{effluent}}{S_{feed}} \times 100.$$

During the test, the density of the effluents obtained at each temperature is measured at 15° C. The evolution of the densities is shown in FIG. 1. This graph allows to determine the temperature that is required to have a given density, refiners being well advised to use the catalyst that will provide this performance at the lowest temperature. It can be seen in FIG. 1 that the catalyst according to the invention allows, under effluent isodensity conditions, to decrease the operating temperature by about 15° C. in relation to catalyst C1A of the prior art. The results obtained for hydrodesulfurization during this test are given in the table below:

| Reference | Catalyst | | 330° C. | Temperature 340° C. | 350° C. |
|---|---|---|---|---|---|
| Relative HDS activity under isovolume conditions in relation to C1A (%) | | | | | |
| C1A | Calcined NiMoP/alumina Not in accordance | — | 100 | 100 | 100 |
| C1E | Dried NiMoP/alumina with additive Not in accordance | PEG + CA in EtOH | 104 | 105 | 106 |
| C1B | Dried NiMoP/alumina with additive In accordance | DMSU + AA in EtOH | 121 | 123 | 126 |

The results obtained show that, for diesel fuel hydrotreatment, it is interesting, as regards hydrodesulfurization as well as hydrodearomatization (which is translated into an evolution of the effluents density), to add dimethyl succinate in combination with acetic acid to the catalyst according to the invention. In fact, as shown by the table above, the HDS activity obtained is 126 at high temperature (corresponding to the ULSD range, i.e. for a sulfur content close to 10 ppm weight) for the catalyst according to the invention, whereas the calcined catalyst is at 100 (reference) and catalyst C1E of the prior art at 106.

EXAMPLE 3

Evaluation of Catalysts C1A (NiMoP/Alumina) (not in Accordance), C1F (in Accordance) in Vacuum Distillate Hydrodenitrogenation for an Application of Hydrocracking Pre-Treatment Type The main characteristics of the vacuum distillate used are given hereafter:

| Density at 20° C.: | 0.9365 |
|---|---|
| Sulfur: | 2.92 wt. % |
| Total nitrogen: | 1400 ppm weight |
| Simulated distillation: | |
| IP: | 361° C. |
| 10%: | 430° C. |
| 50%: | 492° C. |
| 90%: | 567° C. |
| EP: | 598° C. |

The test is carried out in an isotherm pilot reactor provided with a traversed fixed bed, the fluids circulating upwards. After in-situ sulfurization at 350° C. in the plant under pressure by means of a straight-run diesel fuel to which 2 wt. % dimethyldisulfide have been added, the hydrotreatment test is conducted under the following operating conditions:

Total pressure: 12 MPa
Catalyst volume: 40 cm³
Temperature: 380° C.
Hydrogen flow rate: 40 l/h
Feed flow rate: 40 cm³/h.

The catalytic performances of the catalysts tested are given in the table below. They are expressed in relative activity, assuming that that of catalyst C1A is 100 and considering that they are of order 1.5. The relation connecting the activity and the hydrodesulfurization conversion (% HDS) is as follows:

$$A_{HDS} = \sqrt{\frac{100}{100 - \% \ HDS}} - 1 \text{ where}$$

$$\% \ HDS = \frac{S_{feed} - S_{effluent}}{S_{feed}} \times 100$$

The same relation is applicable for hydrodenitrogenation (% HDN and $A_{HDN}$).

Besides, the gross conversion to a fraction having a boiling point below 380° C., obtained with each catalyst, is also evaluated. It is expressed from the simulated distillation results (ASTM D86 method) by the relation:

$$\text{Conversion} = \frac{\% \ 380^+_{feed} - \% \ 380^-_{effluent}}{\% \ 380^+_{feed}}$$

The table below gives the test results obtained for the three catalysts.

| Catalyst | $A_{HDS}$ relative to C1A (%) | $A_{HDN}$ relative to C1A (%) | Conversion 380° C.⁻ (%) |
|---|---|---|---|
| C1A Calcined NiMoP/alumina (not in accordance) | 100 | 100 | 25 |
| C1F NiMoP/alumina DMSU + AA (in accordance) | 145 | 151 | 29 |

The catalytic results obtained show that, in the case of a hydrocracking pre-treatment type application, the catalyst according to the invention is more efficient than a calcined NiMoP catalyst insofar as the catalyst according to the invention allows hydrodesulfurization and hydrodenitrogenation, as well as a conversion gain, which is more surprising.

EXAMPLE 4

Preparation of Catalyst C2A (Calcined NiMoP on Silica-Alumina) (not in Accordance) and of Catalyst C2B (Dried NiMoP on Silica-Alumina with Acetic Acid and Dimethyl Succinate Added) (in Accordance)

Two NiMoP catalysts are prepared with a 3.6/18/1.6 formulation on a silica-alumina of SIRALOX type marketed by SASOL, with a silica content of 25%. A dried catalytic precursor of NiMoP/silica-alumina type is prepared from the $MoO_3$ and $Ni(OH)_2$ precursors solubilized by means of $H_3PO_4$ and by heating under reflux for 2 h at 90° C. The clear solution is then concentrated by evaporation of the water so as to reach the impregnation volume, then impregnated at ambient temperature on the silica-alumina. The support extrudates thus impregnated undergo a maturation stage in a water-saturated closed enclosure, for one night, then they are dried in a stove at 120° C. for 24 h. This catalytic precursor is then divided into two batches:
the first one is calcined at 450° C. for 2 h in air in a traversed fixed bed so as to obtain catalyst C2A (not in accordance),
the second one is used according to the protocol of the invention by impregnating dropwise a solution containing acetic acid and dimethyl succinate with a dimethyl succinate/acetic acid molar ratio of 0.58 until the appearance of nascent moisture, which shows that all the pores have been filled. The catalyst is then left to mature for 3 h and it is then subjected to a thermal treatment at 125° C. for 2 h so as to obtain catalyst C2B in accordance with the invention.

EXAMPLE 5

Toluene Hydrogenation in the Presence of Aniline and Vacuum Distillates Mild Hydrocracking Evaluation of Catalysts C2A (Calcined NiMoP on Silica-Alumina) (not in Accordance) and C2B (Dried NiMoP on Silica-Alumina with Acetic Acid and Dimethyl Succinate Added) (in Accordance)

The goal of the toluene hydrogenation test in the presence of aniline ("HTA" test) is to evaluate the HYDrogenizing (HYD) activity of supported or mass sulfurized catalysts, in the presence of $H_2S$ and under hydrogen pressure. The isomerization and cracking that characterize the acid function of the catalyst supported on silica-alumina are inhibited by the presence of $NH_3$ (resulting from the decomposition of the aniline). The aniline and/or $NH_3$ are thus going to react via an acid-base reaction with the acid sites of the support. All the tests presented are carried out in a plant comprising several microreactors in parallel. During the "HTA" test, the same feed is used for sulfurization of the catalyst and for the catalyst test stage proper. Prior to loading, the catalyst is conditioned, i.e. crushed and sorted so that the grain size of the sample ranges between 2 and 4 mm. 4 cm³ crushed catalyst mixed with 4 cm³ carborundum (SiC, 500 μm) are fed into the reactors.

The feed used for this test is as follows:

| | |
|---|---|
| Toluene | 20 wt. %, |
| Cyclohexane | 73.62 wt. %, |
| DMDS (DiMethylDiSulfide) | 5.88 wt. % (3.8 wt. % S), |
| Aniline | 0.5 wt. % (750 ppm N). |

The catalyst is fed into the reactor in its dried, non-active form. Activation (sulfurization) is performed in the plant with the same feed. It is the $H_2S$ formed after decomposition of the DMDS that sulfurizes the oxide phase. The amount of aniline present in the feed is selected so as to obtain, after decomposition, approximately 750 ppm $NH_3$.

The operating conditions of the toluene hydrogenation test are as follows:
P=6 MPa,
HSV=2 h⁻¹ (feed flow rate=8 cm³/h),
$H_2$/HC=450 Nl/l, ($H_2$ flow rate=3.6 Nl/l),
T=350° C.

The percentage of toluene converted is evaluated and, assuming an order 1 for the reaction, the activity is deduced by means of the relation as follows:

$$AH_{order.1} = \ln \frac{100}{(100 - \% \ HYD_{toluene})}$$

with % $HYD_{toluene}$=percentage of toluene converted.

Catalyst C2A (not in accordance) has an activity of 0.52 and the activity of catalyst C2B (in accordance with the invention) is 0.93, which represents a considerable gain and shows the interest of the combination of acetic acid and dimethyl succinate for increasing the hydrogenizing activity of catalysts of NiMoP on silica-alumina type for mild hydrocracking. A hydrotreatment test on a vacuum distillate type feed is carried out in order to quantify the conversion and hydrodesulfurization gain.

The feed used is a vacuum distillate type feed whose main characteristics are given in the table below.

| Feed | Vacuum distillate |
|---|---|
| Density $_{15/4}$ (g/cm$^3$) | 0.897 |
| Organic S (wt. %) | 0.2374 |
| Organic N (ppm) | 450 |
| WAT* (° C.) | 467 |
| wt. % 370° C.– | 15.9 |

*Weighted Average Temperature = $\dfrac{1T_{5\%} + 2T_{50\%} + 4T_{95\%}}{7}$ with $T_{x\%}$ the boiling temperature of the x% of the liquid cut.

The fraction of extrudates of length ranging between 2 and 4 mm is tested. The 4 cm$^3$ of catalyst are fed into the reactor in their oxide, non-active form. Activation (sulfurization) is carried out in the plant prior to starting the test with a feed referred to as sulfurization feed (straight-run diesel fuel+2 wt. % DMDS). It is the H$_2$S formed after decomposition of the DMDS that sulfurizes the catalysts.

The operating conditions applied during the test are as follows:
P=6 MPa,
HSV=0.6 h$^{-1}$,
Outlet H$_2$/HC=480 Nl/l,
T=380° C.

This test allows to obtain a classification of the catalysts by evaluating the gross conversion of the 370$^+$ fraction to 370$^-$:
Gross conversion to 370$^-$=wt. % 370° C.$^-$ effluents.

The catalytic results are grouped together in the table below. Catalyst C2B in accordance with the invention allows a 5% conversion gain and especially a HDS gain in relation to catalyst C2A (not in accordance) since the S content of the liquid effluents changes from 60 ppm to 32 ppm when dimethyl succinate in combination with acetic acid is added to the catalyst used according to the protocol of the invention.

| | Gross conversion (%) | Total sulfur in the effluent (ppm) |
|---|---|---|
| C2A Calcined NiMoP/silica alumina Not in accordance | 32 | 60 |
| C2B Dried NiMoP/silica alumina with DMSU + AA added In accordance | 37 | 32 |

These results show that, in addition to a hydrogenation gain, the catalyst according to the invention can allow to obtain significant mild hydrocracking gains in relation to a calcined conventional catalyst having a similar formulation.

EXAMPLE 6

Preparation of a Calcined Catalyst C3A (CoMoNiP/Alumina) (not in Accordance), of a Dried Catalyst C3B (CoMoNiP/Alumina with Dimethyl Succinate and Acetic Acid Added) (in Accordance) and of a Dried Catalyst C3C (CoMoNiP/Alumina with Dimethyl Succinate Added) (not in Accordance)

The alumina used in Example 1 is also used here to prepare a <<dried catalytic precursor>> of formulation NiCoMoP/alumina. The precursors used are molybdenum trioxide, cobalt carbonate, nickel hydroxycarbonate and phosphoric acid. The impregnation solution is prepared in a single stage by heating these precursors under reflux. The target corresponds to a content expressed in wt. % of oxide in relation to the dry catalyst (after loss on ignition at 550° C.): NiO/CoO/MoO$_3$/P$_2$O$_5$ ½.3/15/4.4. At the end of the impregnation stage, the extrudates are left to mature over night in a water-saturated atmosphere, then placed for 2 h in a stove at 120° C. The dried catalytic precursor is then obtained and divided, as in Example 4, into three batches:

a first batch is calcined at 450° C. for 3 h so as to obtain catalyst C3A (not in accordance), the second batch is impregnated with a solution containing acetic acid and dimethyl succinate according to the protocol of the invention: the ratio of dimethyl succinate/acetic acid in solution is 0.58 and the dried catalytic precursor is impregnated by this solution until appearance of nascent moisture, which shows that the pores of the catalytic precursor have been filled with the solution containing the dimethyl succinate and the acetic acid. A 2-hour maturation stage is then carried out, followed by a thermal treatment at 140° C. for 1 h. The catalyst thus obtained is catalyst C3B, in accordance with the invention, the third batch is impregnated with dimethyl succinate until appearance of nascent moisture, which shows that the pores of the catalytic precursor have been filled with the dimethyl succinate solution. A 2-hour maturation stage is then carried out, followed by a thermal treatment at 140° C. for 1 h. The catalyst thus obtained is catalyst C3C, not in accordance with the invention.

EXAMPLE 7

Evaluation of Calcined Catalyst C3A (CoMoNiP/Alumina) (not in Accordance), Dried Catalyst C3B (CoMoNiP/Alumina with Dimethyl Succinate and Acetic Acid Added) (in Accordance) and Dried Catalyst C3C (CoMoNiP/Alumina with Dimethyl Succinate Added) (Not in Accordance) in Toluene Hydrogenation Model Molecule Tests In applications such as hydrotreatment of vacuum distillates and residues, the hydro-dehydrogenizing function plays a critical part considering the high proportion of aromatic compounds in these feeds. The toluene hydrogenation test has thus been used to know the interest of catalysts intended for applications such as catalytic cracking pre-treatment or hydrodesulfurization of residues.

The catalysts described in Example 6 above are sulfurized in situ under dynamic conditions in the traversed fixed-bed tubular reactor of a Microcat type pilot plant (manufactured by Vinci), the fluids circulating downwards. The hydrogenizing activity measurements are conducted immediately after sulfurization under pressure and without bringing back in air, with the hydrocarbon feed used for sulfurizing the catalysts.

The sulfurization and test feed consists of 5.8% dimethyldisulfide (DMDS), 20% toluene and 74.2% cyclohexane (by weight).

Sulfurization is carried out at ambient temperature up to 350° C., with a temperature ramp of 2° C./min, an HSV=4 h$^{-1}$ and H$_2$/HC=450 N l/l. The catalytic test is conducted at 350° C. with an HSV=2 h$^{-1}$ and H$_2$/HC equivalent to that of the sulfurization, with minimum 4 samples that are taken and analysed by gas chromatography.

The stabilized catalytic activities with equal volumes of catalysts in the toluene hydrogenation reaction are thus measured.

The detailed activity measuring conditions are as follows:
Total pressure: 6.0 MPa
Toluene pressure: 0.37 MPa
Cyclohexane pressure: 1.42 MPa
Methane pressure: 0.22 MPa
Hydrogen pressure: 3.68 MPa
H₂S pressure: 0.22 MPa
Catalyst volume: 4 cm³ (extrudates of length ranging between 2 and 4 mm)
Hourly space velocity: 2 h⁻¹
Sulfurization and test temperature: 350° C.

Liquid effluent samples are analysed by gas chromatography. Determination of the molar concentrations of unconverted toluene (T) and of the concentrations of its hydrogenation products (methylcyclohexane (MCC6), ethylcyclopentane (EtCC5) and dimethylcyclopentanes (DMCC5)) allows to calculate a toluene hydrogenation rate $X_{HYD}$ defined by:

$$X_{HYD}(\%) = 100 \times \frac{MCC6 + EtCC5 + DMCC5}{T + MCC6 + EtCC5 + DMCC5}$$

The toluene hydrogenation reaction being of order 1 under the test conditions applied and the reactor behaving like an ideal piston reactor, the hydrogenizing activity $A_{HYD}$ of the catalysts is calculated by applying the formula as follows:

$$A_{HYD} = \ln\left(\frac{100}{100 - X_{HYD}}\right)$$

The table hereafter allows to compare the hydrogenizing activities of the catalysts prepared in Example 6.

| Catalyst | Acid type | Amount of acid (wt. % in relation to the final catalyst) | Type of organic additive | Amount of organic additive (wt. % in relation to the final catalyst) | Relative $A_{HYD}$ in relation to C3A (%) |
|---|---|---|---|---|---|
| C3A Not in accordance | — | 0 | — | 0 | 100 |
| C3B In accordance | AA | 13 | DMSU | 20 | 127 |
| C3C Not in accordance | — | 0 | DMSU | 25 | 110 |

These catalytic results show the particular effect as regards the hydrogenizing activity of the combination of acetic acid (AA) and of dimethyl succinate (DMSU) on the dried CoMoNiP/alumina catalytic precursor (in accordance with the invention) in relation to a calcined CoMoNiP/alumina catalyst of the prior art. This hydrogenizing activity gain is particularly advantageous for heavy feed type applications such as catalytic cracking pre-treatment or residue hydrodesulfurization.

The Raman spectra are obtained with a dispersive Raman type spectrometer equipped with an ionized argon laser (514 nm). The laser beam is focussed on the sample by means of a microscope equipped with a ×50 long working distance objective. The power of the laser at the level of the sample is of the order of 1 mW. The Raman signal emitted by the sample is collected by the same objective and dispersed by means of a 1800 rpm network, then collected by a CCD detector. The spectral resolution obtained is of the order of 0.5 cm⁻¹. The spectral zone recorded ranges between 300 and 1800 cm⁻¹. The acquisition time is set at 120 s for each Raman spectrum recorded.

Raman analyses were carried out on catalysts C16 to C19 and showed, for the catalysts in accordance with the invention, the presence in the Raman spectrum of the most intense bands characteristic of Keggin HPAs, dimethyl succinate and acetic acid. The exact position of the bands, their shapes and their relative intensities can vary to a certain extent depending on the spectrum recording conditions, while remaining characteristic of this molecule. The Raman spectra of the organic compounds are besides well documented, either in the Raman spectrum databases (see for example Spectral Database for Organic Compounds, http://riodb01.ibase.aist.go.jp/sdbs/cgi-bin/direct_frame_top.cgi), or by the suppliers of the product (see for example www.sigmaaldrich.com).

The Raman spectra were recorded for catalysts C3B (DMSU+AA) and C3C (pure DMSU) and they are given in FIG. 2. Each measurement was repeated in 3 different zones of the extrudate. In the case of catalyst C3B, the presence of two bands at 990 and 971 cm⁻¹, characteristic of Keggin heteropolyanions, can be seen. The less intense bands, also attributable to these species, are the bands at 970, 902, 602 cm⁻¹ for the Keggin heteropolyanion. The presence of the dimethyl succinate intense band at 851 cm⁻¹ in these two spectra can also be observed. On the other hand, the band at 896 cm⁻¹ is present only on the catalyst according to the invention.

In short, the Raman spectrum of catalyst C3B according to the invention exhibits bands characteristic of Keggin heteropolyanions, dimethyl succinate and acetic acid, whereas catalyst C3C only exhibits the bands characteristic of Keggin heteropolyanions and dimethyl succinate.

EXAMPLE 8

Preparation of Catalysts C1, C2, C3, C4 (CoMoP on Alumina) (not in Accordance with the Invention)

A matrix consisting of ultrafine tabular boehmite or alumina gel, marketed by the Condea Chemie GmbH Company, is used. This gel is mixed with an aqueous solution containing 66% nitric acid (7 wt. % acid per gram of dry gel), then kneaded for 15 minutes. After kneading, the dough obtained is passed through a die with 1.6-mm diameter cylindrical orifices. The extrudates are then dried over night at 120° C., and then calcined at 600° C. for 2 hours under humid air containing 50 kg water per kg of dry air. Support extrudates having a specific surface area of 300 m²/g are thus obtained. X-ray diffraction analysis shows that the support only consists of cubic gamma alumina of low crystallinity.

Cobalt, molybdenum and phosphorus are added on the alumina support described above, which comes in "extrudate" form. The impregnation solution is prepared by hot dissolution of the molybdenum oxide (24.34 g) and cobalt hydroxide (5.34 g) in the phosphoric acid solution (7.47 g) in aqueous solution. After dry impregnation, the extrudates are left to mature in a water-saturated atmosphere for 12 h, then they are dried over night at 90° C. The dried catalytic precursor thus obtained is denoted by C1. The calcination of catalytic precursor C1 at 450° C. for 2 hours leads to calcined catalyst C2. The final composition of catalysts C1 and C2 expressed in form of oxides is then as follows: $MoO_3=22.5\pm0.2$ (wt. %), $CoO=4.1\pm0.1$ (wt. %) and $P_2O_5=4.0\pm0.1$ (wt. %).

Calcined catalyst C2 is fed into a traversed bed unit and sulfurized by a straight-run diesel fuel to which 2 wt. % dimethyl disulfide has been added. An HDS test on a mixture of straight-run diesel fuel and of a diesel fuel from catalytic cracking is then conducted for 300 h. After testing, the used catalyst is unloaded, collected and washed with toluene under reflux, and then separated into two batches. The first batch is regenerated in a controlled combustion oven by introducing for each temperature step increasing amounts of oxygen, which allows to limit the exothermy linked with coke combustion. The final regeneration step is 450° C. The catalyst thus regenerated is analysed by XRD. The absence of line at 26° characteristic of the presence of crystallized $CoMoO_4$ can be observed. This catalyst is denoted by C3 hereafter. The second batch of washed used catalyst is regenerated in a muffle furnace at 400° C. without coke combustion exothermy control. The XRD analysis performed after regeneration shows the presence of a fine line at 26°, characteristic of the presence of crystallized $CoMoO_4$. Besides, the colour of this catalyst, denoted by C4, is a very bright blue.

EXAMPLE 9

Preparation of Catalysts C5, C6, C7, C8, C9, C10, C11, C12 (CoMoP on Alumina with Additive) (not in Accordance with the Invention)

Catalyst C5 is prepared by impregnation of dried catalytic precursor C1 by a solution containing citric acid (CA) and polyethylene glycol (PEG) in solution in ethanol so as to have a volume of impregnation solution equal to the pore volume of dried catalytic precursor C1. The desired proportions of citric acid (CA) and of polyethylene glycol (PEG) are both 10 wt. %.

Catalyst C6 is prepared by impregnation of dried catalytic precursor C1 by a solution containing citric acid (CA) and polyethylene glycol (PEG) in solution in ethanol. The desired proportions of citric acid (CA) and of polyethylene glycol (PEG) are 4 and 10 wt. % respectively.

Catalyst C7 is prepared by impregnation of calcined catalyst C2 by a solution containing citric acid and polyethylene glycol in solution in ethanol so as to have a volume of impregnation solution equal to the pore volume of calcined catalyst C2. The desired proportions of citric acid (CA) and of polyethylene glycol (PEG) are both 10 wt. %.

Catalyst C8 is prepared by impregnation of calcined catalyst C2 by a solution containing citric acid and polyethylene glycol in solution in ethanol. The desired proportions of citric acid (CA) and of polyethylene glycol (PEG) are 4 and 10 wt. % respectively.

Catalyst C9 is prepared by impregnation of calcined catalyst C2 by a solution containing acetic acid (AA) and dimethyl succinate (DMSU) in solution in ethanol. The desired proportions of acetic acid (AA) and of dimethyl succinate (DMSU) are 4 and 10 wt. % respectively.

Catalyst C10 is prepared by impregnation of the regenerated catalyst comprising no refractory phase of $CoMoO_4$ type, C3, by a solution containing citric acid (CA) and polyethylene glycol (PEG) in ethanol so as to have a volume of impregnation solution equal to the pore volume of C3. The desired proportions of citric acid (CA) and of polyethylene glycol (PEG) are both 10 wt. %.

Catalyst C11 is prepared by impregnation of the regenerated catalyst comprising no refractory phase of $CoMoO_4$ type, C3, by a solution containing citric acid (CA) and polyethylene glycol (PEG) in ethanol. The desired proportions of citric acid (CA) and of polyethylene glycol (PEG) are 4 and 10 wt. % respectively.

Catalyst C12 is prepared by impregnation of the regenerated catalyst comprising no refractory phase of $CoMoO_4$ type, C3, by a solution containing acetic acid and dimethyl succinate in ethanol. The desired proportions of acetic acid and of dimethyl succinate are 4 and 10 wt. % respectively.

Catalyst C13 is prepared by impregnation of the regenerated catalyst comprising $CoMoO_4$, C4, by a solution containing citric acid and polyethylene glycol in ethanol so as to have a volume of impregnation solution equal to the pore volume of C4. The desired proportions of citric acid and of polyethylene glycol are both 10 wt. %.

Catalyst C14 is prepared by impregnation of the regenerated catalyst comprising $CoMoO_4$, C4, by a solution containing citric acid and polyethylene glycol in ethanol. The desired proportions of citric acid and of polyethylene glycol are 4 and 10 wt. % respectively.

Catalyst C15 is prepared by impregnation of the regenerated catalyst comprising $CoMoO_4$, C4, by a solution containing acetic acid and dimethyl succinate in ethanol. The desired proportions of acetic acid and of dimethyl succinate are 4 and 10 wt. % respectively.

Catalysts C5 to C15 are then subjected to a 3-hour maturation stage, followed by a 1-hour thermal treatment stage (drying) at 140° C. under nitrogen.

EXAMPLE 10

Preparation of Catalyst C16 (CoMoP with Additive) (in Accordance with the Invention)

Catalyst C16 is prepared by impregnation of dried catalytic precursor C1 by a solution containing acetic acid, dimethyl succinate and ethanol. The desired proportions of acetic acid and of dimethyl succinate are 4 and 10 wt. % respectively. The catalyst is then subjected to a 3-hour maturation stage in air at ambient temperature, followed by a 1-hour thermal treatment stage (drying) at 140° C. under nitrogen.

EXAMPLE 11

Comparative Test of Catalysts C1 to C16 for Toluene Hydrogenation in Cyclohexane Under Pressure and in the Presence of Hydrogen Sulfide The catalysts described above are sulfurized in situ under dynamic conditions in the traversed fixed-bed tubular reactor of a Microcat type pilot plant (manufactured by Vinci), the fluids circulating downwards. The hydrogenizing activity measurements are conducted immediately after sulfurization under pressure and without bringing back in air, with the hydrocarbon feed used for sulfurizing the catalysts.

The sulfurization and test feed consists of 5.8% dimethyldisulfide (DMDS), 20% toluene and 74.2% cyclohexane (by weight).

Sulfurization is carried out from ambient temperature up to 350° C., with a temperature ramp of 2° C./min, an $HSV=4\ h^{-1}$ and $H_2/H=450\ N\ l/l$. The catalytic test is conducted at 350° C. with an $HSV=2\ h^{-1}$ and $H_2/HC$ equivalent to that of the sulfurization, with minimum 4 samples that are taken and analysed by gas chromatography.

The stabilized catalytic activities with equal volumes of catalysts in the toluene hydrogenation reaction are thus measured.

The detailed activity measuring conditions are as follows:
Total pressure: 6.0 MPa
Toluene pressure: 0.37 MPa
Cyclohexane pressure: 1.42 MPa
Methane pressure: 0.22 MPa
Hydrogen pressure: 3.68 MPa
H$_2$S pressure: 0.22 MPa
Catalyst volume: 4 cm$^3$ (extrudates of length ranging between 2 and 4 mm)
Hourly space velocity: 2 h$^{-1}$
Sulfurization and test temperature: 350° C.

Liquid effluent samples are analysed by gas chromatography. Determination of the molar concentrations of unconverted toluene (T) and of the concentrations of its hydrogenation products (methylcyclohexane (MCC6), ethylcyclopentane (EtCC5) and dimethylcyclopentanes (DMCC5)) allows to calculate a toluene hydrogenation rate $X_{HYD}$ defined by:

$$X_{HYD}(\%) = 100 \times \frac{MCC6 + EtCC5 + DMCC5}{T + MCC6 + EtCC5 + DMCC5}$$

The toluene hydrogenation reaction being of order 1 under the test conditions applied and the reactor behaving like an ideal piston reactor, the hydrogenizing activity $A_{HYD}$ of the catalysts is calculated by applying the formula as follows:

$$A_{HYD} = \ln\left(\frac{100}{100 - X_{HYD}}\right)$$

Table 1 compares the hydrogenizing activities relative to the catalysts with additives from dried catalytic precursor C1 (not in accordance), equal to the ratio of the activity of the catalyst with additive to the activity of initial calcined catalyst C2 (not in accordance) taken as the reference (100% activity).

TABLE 1

Relative activities in relation to calcined catalyst C2 (not in accordance) for toluene hydrogenation of catalysts C5, C6 (not in accordance) and C16 (in accordance) with additives prepared from dried catalyst C1 (not in accordance)

| Catalyst | Acid type | Amount of acid (wt. % in relation to the final catalyst) | Organic additive type | Amount of organic additive (wt. % in relation to the final catalyst) | Relative $A_{HYD}$ in relation to C2 (%) |
| --- | --- | --- | --- | --- | --- |
| Calcined C2 Not in accordance | — | 0 | — | 0 | 100 |
| Dried C1 Not in accordance | — | 0 | — | 0 | 75 |
| C5 Not in accordance | CA | 10 | PEG | 10 | — |
| C6 Not in accordance | CA | 4 | PEG | 10 | 105 |
| C16 In accordance | AA | 4 | DMSU | 10 | 138 |

Table 1 shows that dried catalytic precursor C1 (not in accordance) has a lower activity than calcined catalyst C2 (not in accordance). Catalyst C5 with additive (not in accordance), prepared by adding 10% citric acid (CA) and 10% polyethylene glycol (PEG) to dried catalyst C1, could not be tested because the extrudates stuck together in a mass after drying, which shows that excess acid and additive is not suitable in cases where the initial catalyst is a dried catalyst. Catalyst C6 (not in accordance) prepared by adding 4% citric acid (CA) and 10% polyethylene glycol (PEG) to dried catalyst C1 has a 40% improved activity in relation to the initial dried catalyst. However, since initial dried catalyst C1 has a 25% lower activity in relation to calcined conventional catalyst C2, the relative hydrogenizing activity of catalyst C6 in relation to catalyst C2 only shows a 5% gain, which represents the error margin of this test. It is therefore not of interest to add to the dried catalyst the combination consisting of PEG+CA. Finally, catalyst C16 (in accordance) prepared by adding 4% acetic acid (AA) and 10% dimethyl succinate (DMSU) exhibits a 84% gain in relation to initial dried catalyst C1 (not in accordance). In relation to the conventionally used calcined catalyst C2 (not in accordance), the activity of this catalyst C16 (in accordance) shows a 38% gain, which is higher than a new catalyst generation (gain from 25 to 30%). These catalytic results show the particular and surprising effect of the combination of acetic acid (AA) and dimethyl succinate (DMSU) on a dried catalyst (in accordance with the invention) in relation to the combination of citric acid (CA) and polyethylene glycol (PEG) (not in accordance with the invention).

Similarly, Table 2 compares the relative hydrogenizing activities of the catalysts with additives prepared from dried catalyst C1 (not in accordance), equal to the ratio of the activity of the catalyst with additive to the activity of initial calcined catalyst C2 (not in accordance) taken as the reference (100% activity).

TABLE 2

Relative activities in relation to calcined catalyst C2 (not in accordance) for toluene hydrogenation of catalysts C7, C8, C9 with additives (not in accordance) prepared from calcined catalyst C2 (not in accordance)

| Catalyst | Acid type | Amount of acid (wt. % in relation to the catalyst) | Organic additive type | Amount of organic additive (wt. % in relation to the catalyst) | Relative $A_{HYD}$ in relation to C2 (%) |
| --- | --- | --- | --- | --- | --- |
| Calcined C2 Not in accordance | — | 0 | — | 0 | 100 |
| C7 Not in accordance | CA | 10 | PEG | 10 | 102 |
| C8 Not in accordance | CA | 4 | PEG | 10 | 114 |
| C9 Not in accordance | AA | 4 | DMSU | 10 | 105 |

Table 2 surprisingly shows that the activity of catalyst C7 with additive (not in accordance), prepared by adding 10 wt. % citric acid (CA) and 10% polyethylene glycol (PEG) to calcined catalyst C2, is close or even equivalent to that of initial calcined catalyst C2 (not in accordance), which shows that the excess acid and additive that was not suitable in cases where the initial catalyst was a dried catalyst is poorly profitable in the case of a calcined catalyst. Catalyst C8 (not in accordance) prepared by adding 4% citric acid (CA) and 10% polyethylene glycol (PEG) to calcined catalyst C2 has an activity improved by 14 in relation to the initial calcined catalyst. Finally, the activity of catalyst C9 (not in accordance) prepared by adding 4% acetic acid (AA) and 10% dimethyl succinate (DMSU) is close (5% gain) to that of initial calcined catalyst C2 (not in accordance). These catalytic results show the particular interest of the combination of acetic acid (AA) and of dimethyl succinate (DMSU) only on dried catalytic precursor C1 (combination in accordance with the invention) and not on calcined catalyst C2 (combination not in accordance with the invention).

Similarly, Table 3 compares the relative hydrogenizing activities of the catalysts with additives (not in accordance) prepared from the regenerated catalyst containing no refractory phase of $CoMoO_4$ type, C3.

TABLE 3

Relative activities in relation to calcined catalyst C2 (not in accordance) for toluene hydrogenation of catalysts C10, C11, C12 with additives (not in accordance) prepared from regenerated catalyst C3 (not in accordance) having no crystallized phase $CoMoO_4$

| Catalyst | Acid type | Amount of acid (wt. % in relation to the catalyst) | Organic additive type | Amount of organic additive (wt. % in relation to the catalyst) | Relative $A_{HYD}$ in relation to C2 (%) |
|---|---|---|---|---|---|
| Regenerated C3 containing no crystallized phase Not in accordance | — | 0 | — | 0 | 97 |
| C10 Not in accordance | CA | 10 | PEG | 10 | 104 |
| C11 Not in accordance | CA | 4 | PEG | 10 | 109 |
| C12 Not in accordance | AA | 4 | DMSU | 10 | 99 |

Table 3 shows that the activity of catalyst C10 with additive (not in accordance), prepared by adding 10 wt. % citric acid (CA) and 10% polyethylene glycol (PEG) to regenerated catalyst C3 containing no refractory phase of $CoMoO_4$ type, is close or even equivalent to that of initial calcined catalyst C2 (not in accordance), which shows that excess acid and additive is also poorly profitable in the case of a regenerated catalyst having no crystallized $CoMoO_4$ phase. Catalyst C11 (not in accordance) prepared by adding 4% citric acid (CA) and 10% polyethylene glycol (PEG) to regenerated catalyst C3 containing no refractory phase of $CoMoO_4$ type has an activity improved by 12% in relation to initial catalyst C3 (not in accordance), which confers thereon an activity improved by 9% in relation to calcined new catalyst C2. Finally, the activity of catalyst C12 (not in accordance) prepared by adding 4% acetic acid (AA) and 10% dimethyl succinate (DMSU) is close to that of calcined catalyst C2 (not in accordance). These catalytic results show the particular interest of the combination of acetic acid (AA) and of dimethyl succinate (DMSU) on dried catalyst C1 (in accordance with the invention) in relation to the same combination on regenerated catalyst C3 having no crystallized phase of $CoMoO_4$ type (not in accordance with the invention).

Similarly, Table 4 compares the relative hydrogenizing activities of the catalysts with additives prepared from regenerated catalyst C4 (not in accordance) containing $CoMoO_4$. The presence of $CoMoO_4$ is confirmed by XRD analysis.

TABLE 4

Relative activities in relation to calcined catalyst C2 (not in accordance) for toluene hydrogenation of catalysts C4, C13, C14, C15 with additives (not in accordance) prepared from regenerated catalyst C4 (not in accordance) having crystallized phases of $CoMoO_4$ type

| Catalyst | Acid type | Amount of acid (wt. % in relation to the catalyst) | Organic additive type | Amount of organic additive (wt. % in relation to the catalyst) | Relative $A_{HYD}$ in relation to C2 (%) |
|---|---|---|---|---|---|
| Regenerated C4 containing crystallized CoMoO4 Not in accordance | — | 0 | — | 0 | 73 |
| C13 Not in accordance | CA | 10 | PEG | 10 | 103 |
| C14 Not in accordance | CA | 4 | PEG | 10 | 85 |
| C15 Not in accordance | AA | 4 | DMSU | 10 | 75 |

Table 4 shows that the activity of catalyst C13 with additive (not in accordance), prepared by adding 10 wt. % citric acid (CA) and 10% polyethylene glycol (PEG) to regenerated catalyst C4 containing $CoMoO_4$, is close or even equivalent to that of initial calcined catalyst C2 (not in accordance), which shows that excess acid and additive is profitable in the case of a regenerated catalyst having crystallized $CoMoO_4$ phases. In fact, catalyst C14 (not in accordance) prepared by adding 4% citric acid (CA) and 10% polyethylene glycol (PEG) to the regenerated catalyst containing crystallized phases of $CoMoO_4$ type (not in accordance) has an insufficiently improved activity in relation to initial catalyst C4 (not in accordance) since its activity remains lower than that of calcined new catalyst C2. Finally, the activity of catalyst C15 (not in accordance) prepared by adding 4 acetic acid (AA) and 10% dimethyl succinate (DMSU) is close (3% gain) to that of catalyst C4 (not in accordance) and much too low in relation to calcined new catalyst C2. These catalytic results show the particular interest of the combination of acetic acid (AA) and of dimethyl succinate (DMSU) on dried catalyst C1 (in accordance with the invention) in relation to the same combination on regenerated catalyst C4 having crystallized phases of $CoMoO_4$ type (not in accordance with the invention). This combination is particularly ineffective on catalysts containing crystallized refractory phases of $CoMoO_4$ type, unlike the combination of citric acid (CA) and of polyethylene glycol (PEG).

EXAMPLE 12

Preparation of Catalysts C17 and C18 (not in Accordance with the Invention), C19 (in Accordance with the Invention) and Comparison for Diesel Fuel HDS of Catalysts C2 (not in Accordance), C17 and C18 (not in Accordance), C16 and C19 (in Accordance)

Catalyst 17 is prepared by impregnation of catalytic precursor C1 with pure dimethyl succinate (DMSU). This amounts to seeking 30 wt. % dimethyl succinate on the final catalyst. The catalyst is then subjected to a 3-hour maturation stage at 20° C., followed by a 1-hour thermal treatment at 140° C. in air in a traversed bed type oven. The catalyst obtained at the end of this thermal treatment is denoted by C17. This catalyst is not in accordance with the invention because it contains no acetic acid in combination with the dimethyl succinate.

Catalyst C18 is prepared in the same way, but by filling the pores of catalytic precursor C1 with acetic acid. 31 wt. % is obtained in relation to the weight of catalyst. The maturation/thermal treatment stages are similar to C17.

Catalyst C19 is prepared by impregnation of catalytic precursor C1 with a solution containing only the mixture of dimethyl succinate and acetic acid with a dimethyl succinate/molybdenum molar ratio of 1.1. This amounts to seeking contents in relation to the final catalyst of 25 and 18 wt. % for the dimethyl succinate and the acetic acid respectively. The catalyst is then subjected to a 3-hour maturation stage at ambient temperature, followed by a 1-hour thermal treatment at 140° C. in air in a traversed bed type oven. The catalyst obtained at the end of this thermal treatment is denoted by C19. This catalyst is in accordance with the invention.

Catalysts C2 (not in accordance), C16 (in accordance), C17 (not in accordance) and C19 (in accordance) were tested for diesel fuel HDS.

Characteristics of the diesel fuel feed used:

| | |
|---|---|
| Density at 15° C.: | 0.8522 |
| Sulfur: | 1.44 wt. % |
| Simulated Distillation: | |
| IP: | 155° C. |
| 10%: | 247° C. |
| 50%: | 315° C. |
| 90%: | 392° C. |
| EP: | 444° C. |

The test is carried out in an isotherm pilot reactor provided with a traversed fixed bed, the fluids circulating upwards. After in-situ sulfurization at 350° C. in the plant under pressure by means of the diesel fuel tested, to which 2 wt. % dimethyldisulfide have been added, the hydrodesulfurization test is conducted under the following operating conditions:
Total pressure: 7 MPa
Catalyst volume: 30 cm³
Temperature: 340° C.
Hydrogen flow rate: 24 l/h
Feed flow rate: 60 cm³/h.

The catalytic performances of the catalysts tested are given in Table 3. They are expressed in relative activity, assuming that that of calcined catalyst C2 is 100 and considering that they are of order 1.5. The relation connecting the activity and the hydrodesulfurization conversion (% HDS) is as follows:

$$A_{HDS} = \frac{100}{\sqrt{100 - \% \ HDS}} - 1$$

The results obtained are given in Table 5.

TABLE 5

Relative activity, under isovolume conditions, for diesel fuel hydrodesulfurization, of catalysts C16 (in accordance), C17 (not in accordance), C18 (in accordance) in relation to calcined catalyst C2 (not in accordance)

| Catalyst | Summary of the main preparation method differences | $A_{HDS}$ in relation to C2 (%) | Most intense Raman bands (cm⁻¹) |
|---|---|---|---|
| C16 (in accordance) | DMSU (23% of the catalytic precursor pore volume) + AA (9% of the catalytic precursor pore volume) + EtOH (68% of the catalytic precursor pore volume) | 119 | 990, 972 (heteropolyanions) 853 (DMSU) 896 (AA) |
| C17 (not in accordance) | Pure DMSU (100% of the catalytic precursor pore volume) | 109 | 990 (Keggin heteropolyanion) 853 (DMSU) |
| C18 (not in accordance) | Pure AA (100% of the catalytic precursor pore volume) | 85 | 952 (Anderson heteropolyanion) 896 (AA) |
| C19 (in accordance) | DMSU (58% of the catalytic precursor pore volume) + AA (42% of the catalytic precursor pore volume) | 138 | 990, 971 (Keggin heteropolyanions) 851 (DMSU) 895 (AA) |

Table 5 clearly shows the synergetic effect and the particular interest of the combination of acetic acid and of dimethyl succinate on a dried catalytic precursor. In fact, catalysts C17 and C18 (not in accordance) have lower activities than those obtained for catalysts C16 and C19 in accordance with the invention. It is furthermore interesting to note that, in the case of catalyst C19, a larger amount of additive DMSU is impregnated than in the case of catalyst C16, however the activity gain increases, contrary to what has been observed in the case of PEG and citric acid in Example 1.

The Raman spectra are obtained with a dispersive Raman type spectrometer equipped with an ionized argon laser (514 nm). The laser beam is focussed on the sample by means of a microscope equipped with a ×50 long working distance objective. The power of the laser at the level of the sample is of the order of 1 mW. The Raman signal emitted by the sample is collected by the same objective and dispersed by means of a 1800 rpm network, then collected by a CCD detector. The spectral resolution obtained is of the order of 0.5 cm⁻¹. The spectral zone recorded ranges between 300 and 1800 cm⁻¹. The acquisition time is set at 120 s for each Raman spectrum recorded.

Raman analyses were carried out on catalysts C16 to C19 and showed, for the catalysts in accordance with the invention, the presence in the Raman spectrum of the most intense bands characteristic of Keggin HPAs, dimethyl succinate and acetic acid. The exact position of the bands, their shapes and their relative intensities can vary to a certain extent depending on the spectrum recording conditions, while remaining characteristic of this molecule. The Raman spectra of the organic compounds are besides well documented, either in the Raman spectrum databases (see for example Spectral Database for Organic Compounds, http://riodb01.ibase.aist.go.jp/sdbs/cgi-bin/direct_frame_top.cgi), or by the suppliers of the product (see for example www.sigmaaldrich.com).

Without being bound by any theory, it has been observed that non-complexing organic additives allow reformation of the heteropolyanions in solution in the pores of the catalyst. It is typically this phenomenon that is highlighted with the appearance of the heteropolyanion bands after impregnation of the solution comprising the mixture of dialkyl succinate and of acetic acid. This effect has been referred to as "reformation of heteropolyanions" because the latter are initially present in the impregnation solution but they are not present on the freshly impregnated dried catalytic precursor; they however reform during the maturation stage after impregnation of the additive. In the case of PEG in the presence of citric acid, the complexing effect allows disappearance of the crystallized phases, readily characterized by XRD, but no heteropolyanion is reformed.

The invention claimed is:

1. A catalyst comprising an alumina-based amorphous support, phosphorus, at least one C1-C4 dialkyl succinate, acetic acid and a hydro-dehydrogenizing function comprising at least one group VIII element and at least one group VIB element, said catalyst having a Raman spectrum which comprises the main bands at 990 and/or 974 cm$^{-1}$ characteristic of at least one Keggin heteropolyanion, the bands characteristic of said succinate and the main band at 896 cm$^{-1}$ characteristic of acetic acid.

2. A catalyst as claimed in claim 1, wherein the dialkyl succinate is dimethyl succinate, and the catalyst has in its spectrum the main Raman bands at 990 and/or 974 cm$^{-1}$ characteristic of Keggin heteropolyanions, 853 cm$^{-1}$ characteristic of dimethyl succinate and 896 cm$^{-1}$ characteristic of acetic acid.

3. A catalyst as claimed in claim 1, wherein the dialkyl succinate is diethyl succinate, dibutyl succinate or diisopropyl succinate.

4. A catalyst as claimed in claim 1, comprising a support of alumina.

5. A catalyst as claimed in claim 1, comprising a support of silica-alumina.

6. A catalyst as claimed in claim 1, also comprising boron and/or fluorine.

7. A catalyst as claimed in claim 1, wherein the hydro-dehydrogenizing function is cobalt and molybdenum, and the support is alumina.

8. A catalyst as claimed in claim 1, wherein the hydro-dehydrogenizing function is nickel-molybdenum, nickel-cobalt-molybdenum or nickel-molybdenum-tungsten.

9. A catalyst as claimed in claim 1 that is sulfurized.

10. A method of preparing a catalyst as claimed in claim 1, said method comprising the following successive stages:
    a) at least one stage of impregnation of an alumina-based amorphous support by at least one solution containing the elements of the hydro-dehydrogenizing function and phosphorus,
    b) drying at a temperature below 180° C. without subsequent calcination,
    c) at least one stage of impregnation by an impregnation solution comprising at least one C1-C4 dialkyl succinate, acetic acid and at least one phosphorus compound, if the latter has not been entirely introduced in stage a),
    d) a maturation stage,
    e) a drying stage at a temperature below 180° C., without subsequent calcination stage.

11. A method as claimed in claim 10, wherein all of the hydro-dehydrogenizing function is introduced in stage a).

12. A method as claimed in claim 10, wherein stage c) is carried out in the absence of additional solvent.

13. A method as claimed in claim 10, wherein stage c) is carried out in the presence of a solvent that is methanol, ethanol, water, phenol, cyclohexanol, alone or in admixture.

14. A method as claimed in claim 10, wherein the dialkyl succinate and the acetic acid are introduced into the impregnation solution of stage c) in an amount corresponding to a molar ratio of dialkyl succinate to group VIB element(s) impregnated with the catalytic precursor ranging between 0.15 and 2 mole/mole, and to a molar ratio of acetic acid to group VIB element(s) impregnated with the catalytic precursor ranging between 0.1 and 5 mole/mole.

15. A method as claimed in claim 10, wherein stage d) is carried out at a temperature ranging from 17° C. to 50° C.

16. A method as claimed in claim 10, wherein stage e) is carried out at a temperature ranging from 80° C. to 160° C., without subsequent calcination at a temperature above 180° C.

17. A method as claimed in claim 10, said method comprising the following successive stages:
    a) at least one stage of dry impregnation of said support by a solution containing all of the elements of the hydro-dehydrogenizing function, and phosphorus,
    b) drying at a temperature ranging between 75° C. and 130° C. without subsequent calcination,
    c) at least one stage of dry impregnation by an impregnation solution comprising the dimethyl succinate and the acetic acid,
    d) a maturation stage at 17° C.-50° C.,
    e) a drying stage at a temperature ranging between 80° C. and 160° C., without subsequent calcination stage.

18. A method as claimed in claim 10, wherein the amount of phosphorus introduced in stage a) or in stage c), if the latter has not been entirely introduced in stage a), expressed in amount of oxide in relation to the catalyst, ranges between 0.1 and 20 wt. %.

19. A method as claimed in claim 10, wherein stage e) is carried out under nitrogen.

20. A method as claimed in claim 10, wherein the product obtained at the end of stage e) is subjected to a sulfurization stage.

21. A method comprising hydrotreatment of a hydrocarbon feed carried out in the presence of a catalyst as claimed in claim 1.

22. A method as claimed in claim 21, wherein the hydrotreatment is hydrodesulfurization, hydrodenitrogenation, hydrodemetallation, hydrogenation of aromatics or hydroconversion.

23. A method as claimed in claim 22, wherein the hydrotreatment is deep diesel fuel hydrodesulfurization.

* * * * *